United States Patent [19]

Ackeret

[11] Patent Number: 4,807,749
[45] Date of Patent: Feb. 28, 1989

[54] CONTAINER FOR FLAT RECORDING MEDIA

[75] Inventor: Peter Ackeret, Kusnacht, Switzerland

[73] Assignee: IDN Inventions and Development of Novelties AG, Chur, Switzerland

[21] Appl. No.: 142,187

[22] Filed: Jan. 11, 1988

Related U.S. Application Data

[63] Continuation of Ser. No. 862,232, Apr. 1, 1986, abandoned.

[30] Foreign Application Priority Data

Aug. 2, 1984 [DE] Fed. Rep. of Germany ... 8423026[U]
Dec. 18, 1984 [DE] Fed. Rep. of Germany ... 8436936[U]

[51] Int. Cl.⁴ .................. B65D 85/57; B65D 85/672
[52] U.S. Cl. .................................. 206/387; 206/307; 206/309; 312/12; 312/16
[58] Field of Search ........ 206/309, 444, 387, 804–815; 312/9–19, 292, 330 R, 333

[56] References Cited

U.S. PATENT DOCUMENTS

| | | | |
|---|---|---|---|
| 1,371,766 | 3/1921 | Johnson | 312/12 |
| 3,232,397 | 2/1966 | McCoy | 206/815 |
| 3,642,337 | 2/1972 | Manheim | 206/387 |
| 3,899,229 | 8/1975 | Ackeret | 312/111 |
| 3,904,259 | 9/1975 | Hoffmann et al. | 206/387 |
| 4,046,255 | 9/1977 | Ackeret | 206/387 |
| 4,129,347 | 12/1978 | Godschalck | 312/330 R |
| 4,191,292 | 3/1980 | Schweizer | 206/387 |
| 4,488,644 | 12/1984 | Wynalda | 206/387 |
| 4,655,344 | 4/1987 | Ackeret | 312/12 |

FOREIGN PATENT DOCUMENTS

| | | |
|---|---|---|
| 0086275 | 8/1983 | European Pat. Off. |
| 0092666 | 11/1983 | European Pat. Off. |
| 0100823 | 2/1984 | European Pat. Off. |
| 2427104 | 12/1975 | Fed. Rep. of Germany |
| 2917806 | 11/1980 | Fed. Rep. of Germany ...... 312/9 |
| 3015748 | 10/1981 | Fed. Rep. of Germany ...... 206/387 |
| 0011714 | of 1896 | United Kingdom ............ 312/330 R |
| 2077234 | 12/1981 | United Kingdom ............ 206/387 |
| 2099793 | 12/1982 | United Kingdom ............ 206/387 |

*Primary Examiner*—Jimmy G. Foster
*Attorney, Agent, or Firm*—Chilton, Alix & Van Kirk

[57] ABSTRACT

A container for flat recording media with a housing and at least one slidably movable slider member, the front wall of which closes the opening in the housing. The front wall has a cut-out which makes it possible for a recording medium lying flat in the slider member to be grasped by its broad faces, the cut-out preferably being coverable by means of a separate component.

26 Claims, 6 Drawing Sheets

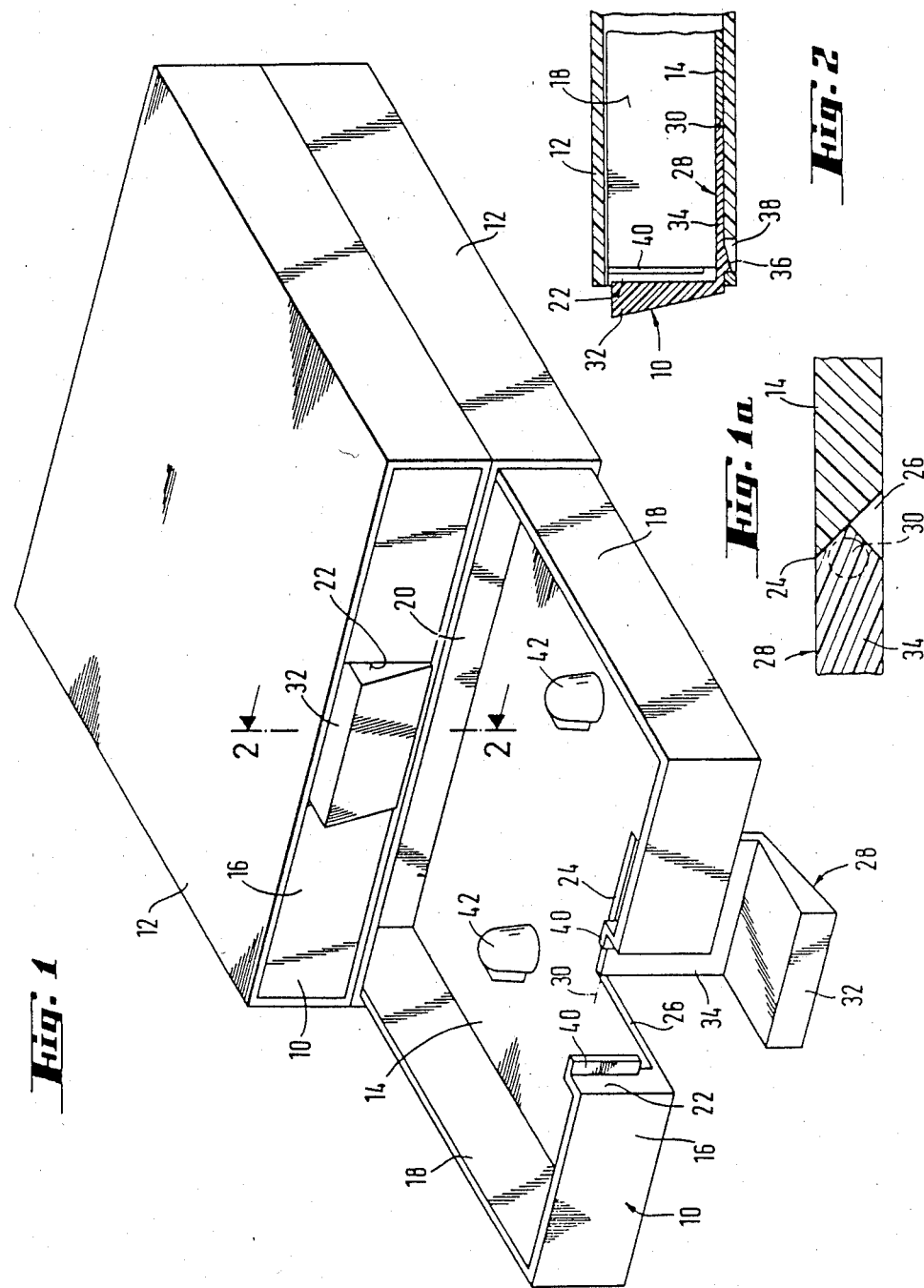

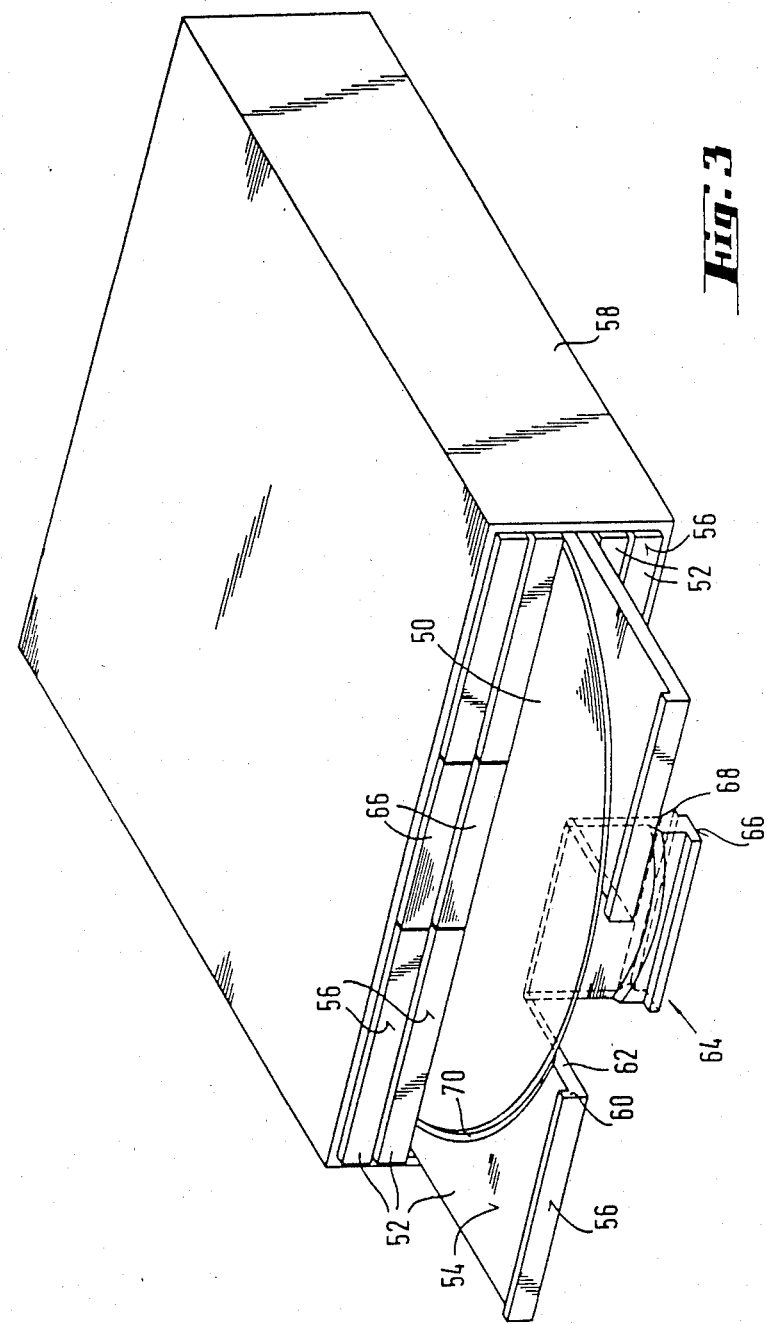

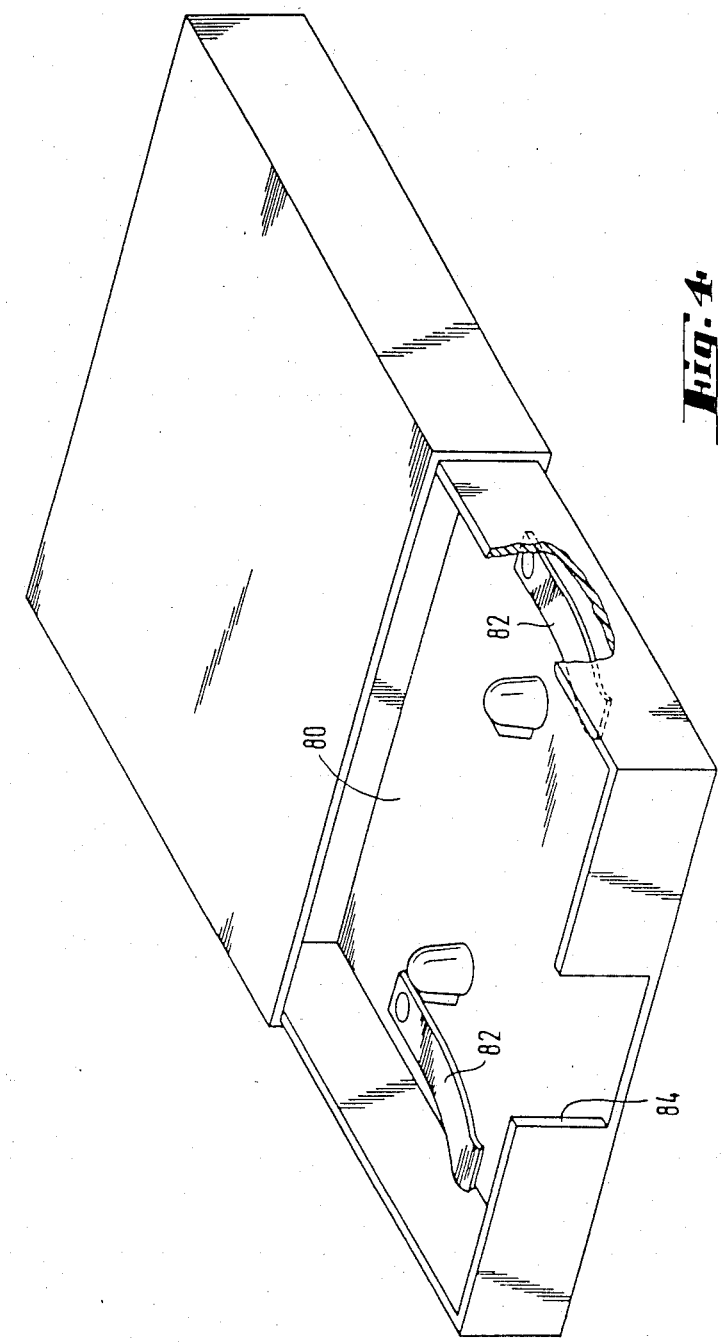

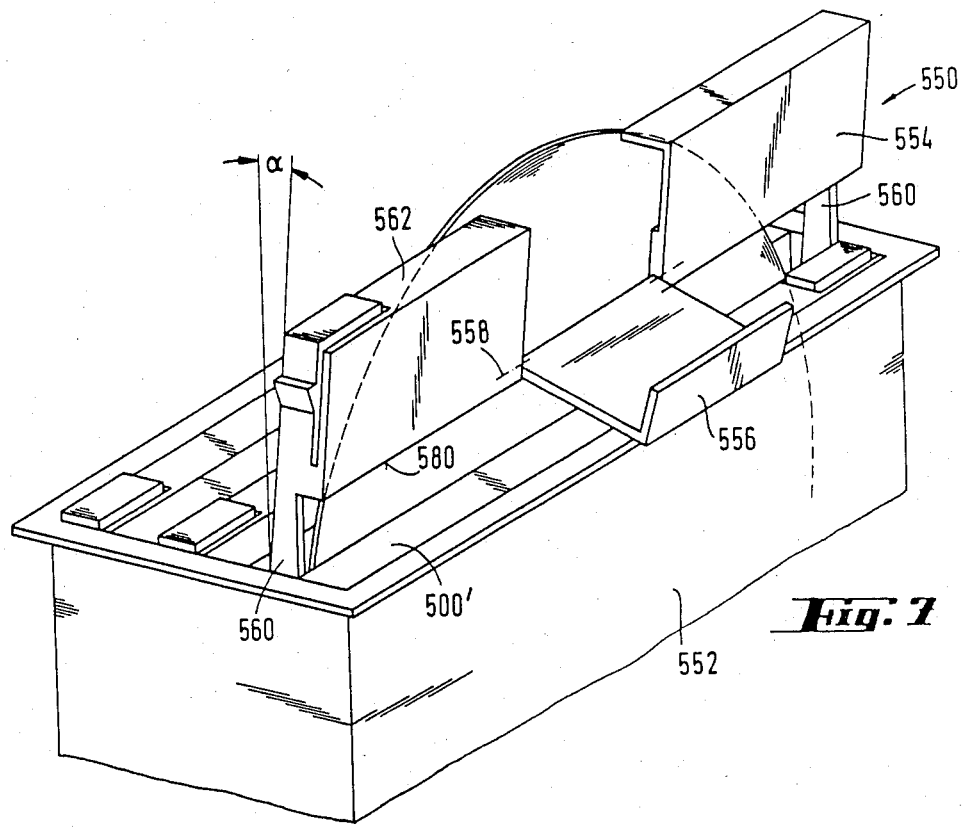
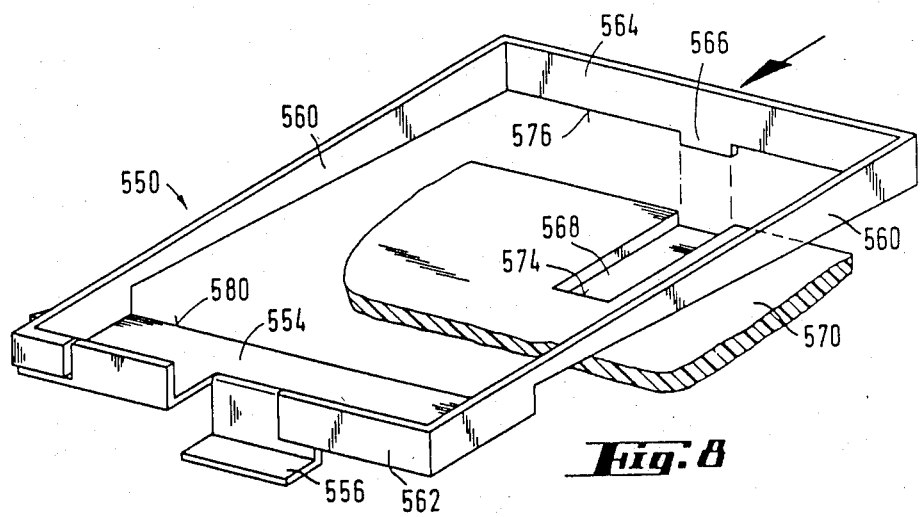

CONTAINER FOR FLAT RECORDING MEDIA

This is a continuation of copending application Ser. No. 862,232, filed on 4/1/86, now abandoned.

BACKGROUND OF THE INVENTION

This invention relates to methods of and apparatus for the storage and retrieval of recording media, such as magnetic tape cassettes, records, laser readable optical storage discs, i.e., the so-called "compact" discs, or video discs. More particularly, the present invention is directed to improved systems for the temporary storage, on a slider member which may be selectively locked in or released from a housing, of so-called "compact cassettes" and "compact discs". A prior art container for use in the storage of compact cassettes is disclosed in published Federal Republic of Germany patent application Ser. No. 22 48 408.

In the apparatus of the above-referenced German application the slider member on which a compact cassette is supported during storage has no side walls. Accordingly, the user of the device of the published German application, with the hand outspread, can grasp the cassette from above by two of its opposed narrow sides and remove the cassette from the slider member for use. The guiding arrangement for the slider member is provided in a space between the floor of the slider member and the underlying housing floor. This arrangement increases the overall height of a storage device comprising a housing and its cooperating slider member and the amount of material needed to fabricate the device, which is particularly disadvantageous in the case of a mass-produced article.

The problem to which the present invention is directed is that of providing a storage system for recording media comprising a housing in which a slider member is mounted, the slider member being moveable between an inserted position and an ejected position under the influence of a biasing spring, and having a front wall which closes the housing openings when the slider member is in the inserted or storage position. A storage system in accordance with the present invention also includes stops for limiting the relative motion between the slider and housing to the desired ejected position of the slider member and, of course, a locking arrangement for retaining the slider member in the housing against the bias of the ejection spring. A storage system in accordance with the invention is also provided with means for guiding the slider member during its motion relative to the housing. Additionally, and most importantly, the present invention is directed to the provision of a storage system which is characterized by reduced overall height when compared to the prior art while the removal of the recording medium from the slider member is nevertheless possible without any particular manual dexterity. This may be contrasted from the manner in which the similar problem is addressed in published Federal Republic of Germany application Ser. No. 25 21 371, for example.

SUMMARY OF THE INVENTION

The present invention solves the above-briefly discussed and other problems by providing, in the front wall of a slider member, a cut-out and, additionally, by providing means by which recording media carried by the slider member may be easily grasped via this cut-out in a pincer-like manner on its broad faces when the slider member is in the ejected position whereby the recording media may be removed from the slider member by lifting it over the front wall thereof. It should be noted that grasping a recording medium by its opposed broad faces requires less dexterity than previously gripping action needed for the known storage systems which in the case of larger recording media, for example the known "compact discs", can even be distinctly uncomfortable, at least for children's hands.

In accordance with the present invention, in order to make the lower broad face of the recording medium accessible, the recording media is either lifted up somewhat from the floor of the slider member, or a cut-out continuing the front wall cut-out can also be provided in the floor of the slider member, or the front wall can be lowered somewhat, by being pivoted.

In order to insure that the recording medium will be protected in spite of the opening in the front wall of the slider member, and also for aesthetic reasons, it is preferred that the front wall cut-out be provided with a closure member which is expediently combined with the means for releasing the slider member locking system.

BRIEF DESCRIPTION OF THE DRAWINGS

In the accompanying drawings, example embodiments for compact cassette and compact disc containers are shown; it should be pointed out, however, that this type of container construction is also suitable for example for 8 mm. video cassettes, video discs, etcetera. In the case of cassette containers, the arrangement is so selected that the cassette lies transversely in the slider member, i.e., with the longest dimension perpendicular to the ejection direction but the form of execution according to the invention can equally be used when the cassette lies longitudinally in the slider member.

FIG. 1 shows two compact cassette containers according to the invention stacked one above the other, the lower one being opened, FIG. 1a is a partial section through the hinged joint of the closure member for the cut-out, in the front wall of one slider member FIG. 2 is a section along the line 2—2 in FIG. 1, FIG. 3 shows a container similar to that shown in FIG. 1, but for compact discs, FIG. 4 shows an alternative to FIG. 1, FIG. 7 shows in perspective the front section of a further embodiment, and FIG. 8 shows schematically the tilting mechanism of the slider member in the construction according to FIG. 7.

Figure 5:
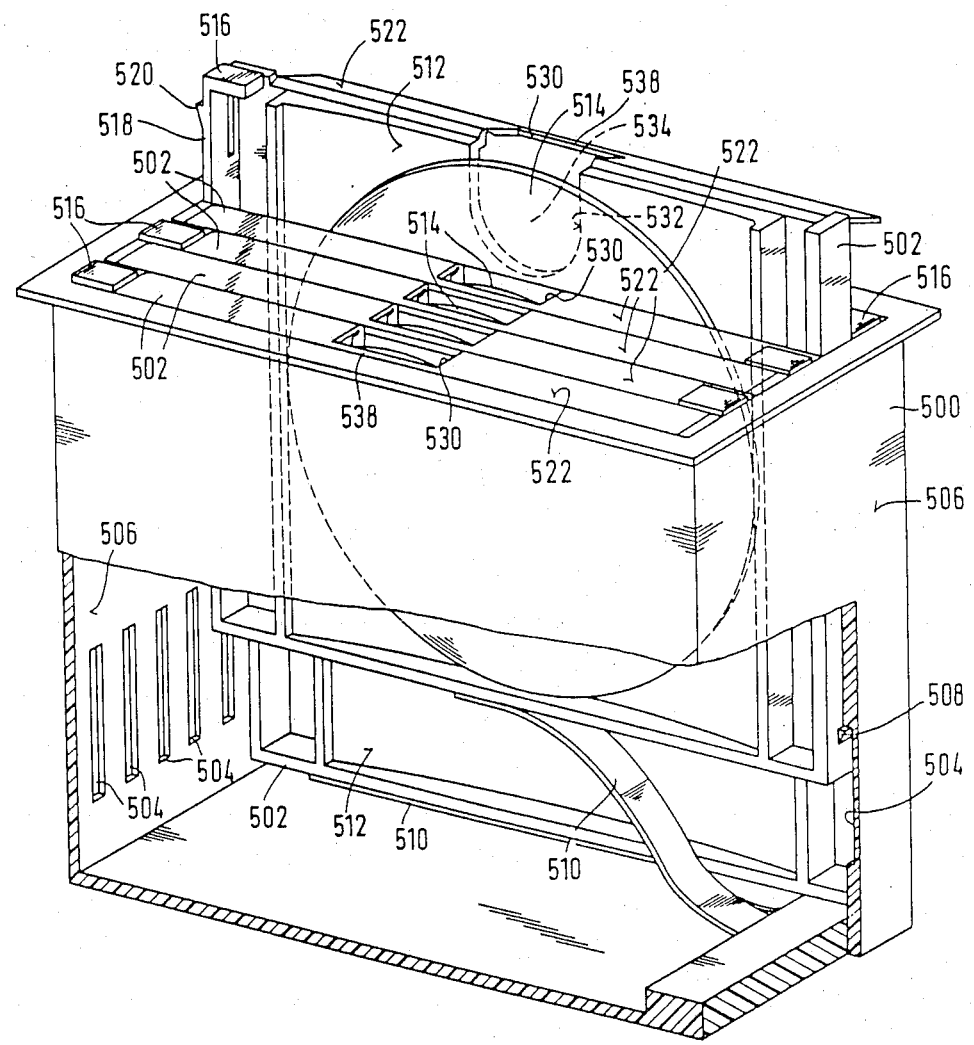
FIG. 5 shows a perspective view, partly cut away, of a container according to the invention.

In the embodiment according to FIG. 1, there are provided for each slider 10 separate housings 12 which can be stacked into blocks by means of elements on the top and bottom walls of the housing which interlock with each other. These elements do not form part of the invention and are not therefore illustrated.

Each slider member 10 comprises a floor 14 from which a front wall 16, side walls 18 and a rear wall 20 rise up perpendicularly. A compression spring acts between the rear wall of the housing and the rear wall of the slider member, and stop lungs project from the floor of the slider member into slots in the floor of the housing. For clarity, these elements are not shown, either, but they are described in the published German application No. DE-C-22 48 408 mentioned above.

The center of the front wall 6 has a rectangular cut-out 22 which continues into the floor 14. The inner transverse edge 24 of this floor cut-out 26 is straight, and immediately in front of it a closure element 28 is hinged on by means of a hinge 30. The closure member is complementary in shape to the front and floor cut-outs 22,26 and is accordingly L-shaped in profile having two limbs.

FIG. 1a shows in an enlarged partial section the preferred form of the hinge region. On the limb of the closure member closes to the housing, pins are formed which are snapped into complementary bearings in the floor of the slider member. The transverse edge 24 of the cut-out 26 in the floor 14 runs obliquely upward and forward from the bottom to the top surface of the floor. The edge of the closure member facing towards edge 24 has a peaked cross-section, shaped like a pitched roof. The closure member accordingly has two preferred positions defined by the two angles of the peaked cross-section. These are the closed position shown in FIG. 1a and the opening position shown in FIG. 1, which the closure member reaches as a result of the inherent spring action associated with the deflection of the closure member. The elastic deformation of the components involved in fact produces a so-called "frog spring" arrangement.

The free limb of the closure member 28 is constructed as a button 32. The hinged limb 34 carries on its underside, which faces towards the housing floor when the slider member is pushed in, a hook 36 which can engage in a recessed catch 38 in the housing floor. This locks the slider member against the bias of the ejector spring arrangement. To release the locking system, the button 32 is lifted up. Adjoining the edges defining the front wall cut-out there are inwardly angled extensions 40 which cover the gap between the button 32 and the front wall and prevent the closure member from being accidentally pivoted inwards with the cassette removed in which circumstance the hinge 30 could be damaged.

After the slider member 10 has been ejected, the closure member 28 is folded into the position which is shown for the lower slider member in FIG. 1, so that an inserted cassette can be grasped above and below and pulled out, being lifted over the front wall 16. The tape winding hubs of the cassette (not shown) thereby also come free of the blocking projections 42 formed on the floor of the slider member.

FIG. 3 shows an embodiment for the storage of compact discs, which in principle is constructed in the same way as that for compact cassettes.

For each disc 50 there is provided a separate slider member 52 which essentially has a floor 54 and a front wall 56 which is injection-moulded in one piece with the floor. In the example embodiment, a common housing 58 is associated with five slider members. Front wall cut-out section 60, floor cut-out 62 and closure member 64 with button 66 and locking hook 68 correspond to the first example embodiment, apart from the smaller vertical dimensions.

The slider members 52 here have no side walls adjoining the front wall and extending perpendicularly towards the rear. Instead, in the floor of the slider member a depression 70 matched to the diameter of the disc 50 is provided. The enclosed inner surface of depression 70, not visible in the drawing, is concave so that the disc can come into contact with the slider member only at the disc outer edge, even during insertion or removal.

In the alternative form of the compact cassette container according to FIG. 4 the floor cut-out is omitted. The front wall cut-out 84 extends only as far as the upper side of the slider member floor 80. In order that the cassette can nevertheless be comfortably grasped, a lifting device is provided in the form of two leaf springs 82 which are of such dimensions that when the slider member is in the removal position according to FIG. 4 the leaf spring can lift an inserted cassette at least so far that through the front wall cut-out 84 it is possible also to grasp the side of the cassette facing towards the floor 80. On the other hand, the springs 82 must be weak enough allow the insertion of the slider member into the housing with the cassette placed on it. The ejector spring arrangement, guides, stops and locking arrangement for the slider member are not shown in this case. In this embodiment a locking arrangement as disclosed in European Patent Application No. 83108472.8 is for example appropriate.

FIGS. 5–8 show containers according to the invention for records or video discs, particularly for so-called compact discs.

Players for compact discs are often so constructed that the disc—which is relatively insensitive to perspiration on the fingers—is grasped by its major surfaces in a pincer-like manner and pushed into an insertion slot in the player. For simple handling, which is especially important when the container is used in a motor vehicle for operation by the driver, it is therefore desirable that the disc can and should be grasped in the same manner when being removed from and inserted into the container.

In FIG. 5 a substantially parallelepipedal housing 500 with an open front can be seen in which six slider members arranged parallel to one another and in the form of holders 502 are slidably guided. They are guided in grooves 504 in the side walls 506 of the housing in which guide projections 508 of the holders engage. A second set of grooves and projections is provided above those visible in the cut-away section, so that the holders are securely guided. The front ends of the grooves define the outer end, or ejected, position of the holders. In the floor region of the housing, leaf springs 510 are mounted at one end to the floor and at the other end act on the rear edge of the holders facing away from the front. All six leaf springs could also consist of a common comb-like stamped and bent part.

Figure 6:
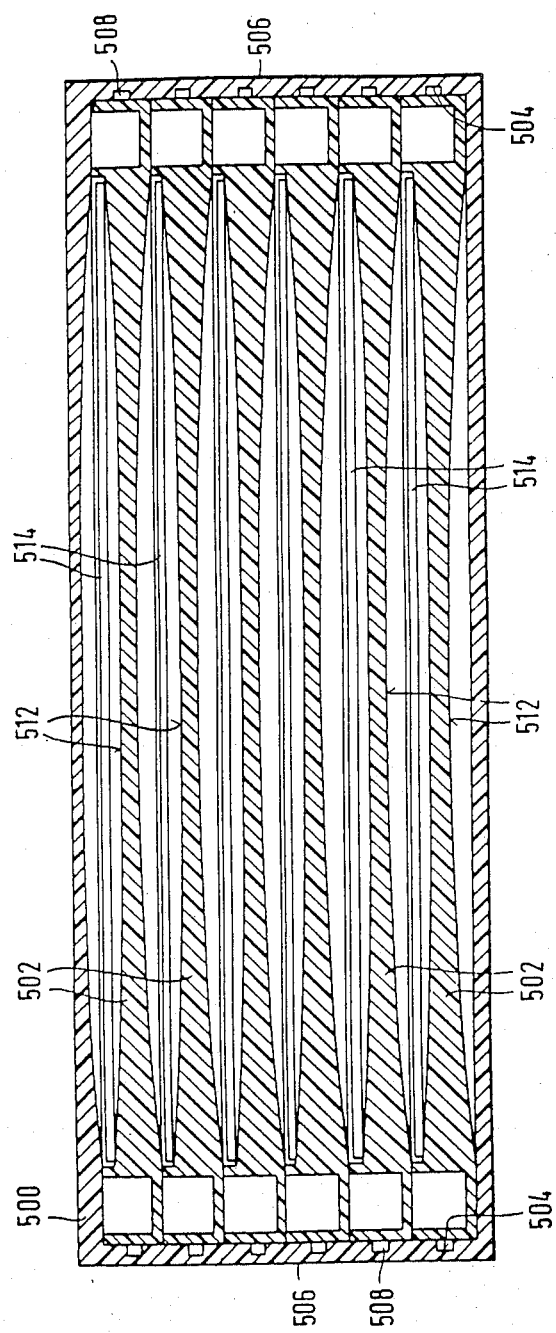
FIG. 6 is a schematic sectional view through the container according to FIG. 5.

The holders comprise a platter-like main part 512, the cross-section outline of which is shown in FIG. 6. According to this, each holder, on the side where a disc 514 rests on it, has a dish-like depression, 512. When there is relative movement of the disc with respect to the holder in question the side of the disc facing the holder can come into contact only in its rim or edge region with the holder, so that it can in no case be scratched. The side of the holder remote from the disc is also preferably recessed in the same way, so that the other side of the disc cannot be scratched, and the top wall of the housing is shaped to correspond, as can be seen in FIG. 6. The same also applies to the example embodiment to FIGS. 7 and 8, athough in that case, for the sake of simplicity, the depressions are not shown again. As will be described more fully below with respect to the embodiment shown in FIGS. 7 and 8 intermediate floors 570 are provided in the housing, and these then have the dish-like depressions.

Referring again to FIGS. 5 and 6, each holder has side bars extending longitudinally along the main part 512 and carrying the projections 508 for engaging grooves 504. At the front portion of a bar, each holder has a moulded-on button 516 which is formed on a leaf spring 518 defined by a longitudinal cut in the bar. This allows the button to deflect laterally in the plane of the holder and thereby disengage a locking hook 520 from a catch provided in the housing. This type of locking arrangement is known in principle from the publication referred to above.

A front wall 522 is linked to the holder by means of an integral so-called "film link" and is biased into the position shown in FIG. 1 by means of a spring, preferably by means of a leaf spring (not shown) built in the region of the film link. When the holder is pushed in to the housing, the front wall 522 engages with small projections (not shown) with a frictional connection in corresponding recesses of the holder, which are above the respective walls, or—for the topmost holder—of the housing. The locking force on the front wall is overcome by the leaf spring 510 when the corresponding button is unlocked, so that the front wall pivots away as the holder moves out toward the ejected position.

Each front wall has a cut-out 530 with which a floor cut-out 532 in the platter-like main part 512 is associated. It can be seen that when the holder is extended, in the ejected position a part 534 of the disc can be grasped on both sides with the fingers in a pincer-like manner and can be pulled out over the front wall substantially along the same plane on which the disc was stored in the holder. Insertion is just as simple, with the portion of the main part 512 which is extended out of the housing forming a guide surface. The user need not therefore aim for the slot between two holders, so that the container can be fed "blind" to a certain extent. A connecting piece 538 connects the two parts of the front wall on either side of the cut-out. The connecting piece is provided on the edge of the front wall remote from the main part 512 so that the cut-out is not covered.

In the embodiment according to FIGS. 7, 8, the entire holder pivots, or tilts about an axis near the end which is inside the housing, as will be explained in detail with reference to FIG. 8. In FIG. 7 one ejected holder 550 and the housing 552 can be seen. It should be noted that the holder in FIG. 7 is shown pushed out too far in order to make its contruction clear; in reality it only travels far enough out of the housing for it just to be able to execute the tilting movement through angle α when its floor surface 554 has passed the front of the housing. Approximately centrally in the front wall an angled cover member 556 which is L-shaped in cross-section is hinged onto the holder at 558; it is spring-biased into the folded-down position shown in FIG. 7, and when the holder is pushed into the housing automatically moves into the covering position since it runs up against the upper edge of the next lower holder which is situated beneath it and is flush with the front of the housing, or, in the case of the lowest holder 500', against the housing floor.

The spring arrangement to bias the holders into the ejection position and the release button with manually unlockable detent correspond to the embodiment according to FIGS. 5 and 6.

As can be seen from FIG. 8, which is schematicised to a great extent, each holder comprises a frame which is guided along the side walls of the housing and the side-pieces 560 of which, running parallel to the ejection direction, have approximately triangular cut-outs. The rear wall 564 of the holder inside the housing opposite the front wall 562 is provided with an extension 566 which runs in a groove 568; the groove is situated in intermediate floors 570 of the housing, or, for the lowest holder, in the housing floor. When during the ejection movement of the holder the extension meets the end edge 574 of the groove, the holder has just moved so far out of the housing that its floor surface 554 has passed the front of the housing, and since the ejection spring above the extension acts on the holder, a turning moment is produced about the lower edge 576 which causes the holder to tilt. To push the holder back in again, it is tilted back by hand and pushed in, whereupon the locking system engages automatically.

The intermediate floors 570 extend in the direction of the front of the housing as far as the line where the end edge 580 of the floor plate 554 is situated when the holder is pushed in, so that the disc can then rest partly on the intermediate floor and partly on the floor plate. As mentioned above, these parts are preferably provided with dish-like depressions, but this is not shown in FIGS. 7 and 8.

In an alternative form, provision can be made for connecting-pieces to extend from the intermediate floors as far as the front wall of the holder in question, engaging in corresponding cut-outs in the floor plate 554, so that the insertion of the disc can take place without any problems.

I claim:

1. A container for flat recording media comprising:
   a housing having a front opening, said housing being sized to receive a plurality of slider members, and further including a plurality of intermediate floors formed in the housing to define individual compartments to receive the slider members, the intermediate floors having dish-like depressions;
   a slider member cooperating with said housing for receiving the recording media and sliding in a first direction between a storage position wherein the recording media is fully within said housing to an ejected position partly outside the housing, the recording media having broader faces which lie substantially parallel to the side first direction when the media is supported on said slider member, said slider member further including a front wall for closing at least the portion of said housing front opening provided for said slider member when the slider member is pushed from the ejected position into the storage position, said front wall including a cut-out;
   first spring means for biasing the slider member toward the ejected position;
   stop means for limiting the travel of the slider member in said first direction and therefore defining said ejected position;
   locking means for holding the slider member in the storage position against the bias of said first spring means; and
   removal means operatively associated with said front wall for exposing portions of the broader faces of the recording media in the vicinity of the cut-out when said slider member is in the ejected position, such that the media can be manually grasped, pincer-like through the cut-out, and removed from the slider member over the front wall.

2. A container for flat recording media comprising:
   a housing having a front opening;

a slider member cooperating with said housing for receiving the recording media and sliding in a first direction between a storage position wherein the recording media is fully within said housing to an ejected position partly outside the housing, the recording media having broader faces which lie substantially parallel to the said first direction when the media is supported on said slider member, said slider member further including a floor and a front wall for closing at least the portion of said housing front opening provided for said slider member when the slider member is pushed from the ejected position into the storage position, said front wall including a cut-out defining a free space;

first spring means for biasing the slider member toward the ejected position;

stop means for limiting the travel of the slider member in said first direction and therefore defining said ejected position;

locking means for holding the slider member in the storage position against the bias of said first spring means; and removal means formed by a cut-out in the slider member floor that extends the free space of the front wall cut-out, for exposing portions of the broader faces of the recording media in the vicinity of the cut-outs when said slider member is in the ejected position, such that the media can be manually grasped, pincer-like through the cut-outs, and removed from the slider member over the front wall.

3. A container according to claim 2 wherein the means for closing the front wall cut-out also includes means for closing the cut-out in the floor of the slider member.

4. A container according to claim 3 wherein the cut-out in the floor of the slider member has one end facing towards the housing, the means for closing the front wall cut out is L-shaped in profile so as to include two limbs, and one of said limbs is joined by a hinge to said one end of the cut out in the floor.

5. A container according to claim 4 wherein said locking means interacts between the means for closing the front wall and the housing, in that on the said one hinged limb a hook is formed which in order to lock the slider member engages in a recessed catch in the housing and can be released therefrom by lifting the other of said limbs.

6. A container for flat recording media comprising:
a housing having a front opening;
a slider member cooperating with said housing for receiving the recording media and sliding in a first direction between a storage position wherein the recording media is fully within said housing to an ejected position partly outside the housing, the recording media having broader faces which lie substantially parallel to the said first direction when the media is supported on said slider member, said slider member further including a floor and a front wall for closing at least the portion of said housing front opening provided for said slider member when the slider member is pushed from the ejected position into the storage position, said front wall including a cut-out;

first spring means for biasing the slider member toward the ejected position;

stop means for limiting the travel of the slider member in said first direction and therefore defining said ejected position;

locking means for holding the slider member in the storage position against the bias of said first spring means; and removal means operatively associated with said front wall for exposing said portions of the broader faces of the recording media in the vicinity of the cut-out when said slider member is in the ejected position, said removal means including a lifting spring for lifting the recording media away from the slider member floor in the vicinity of the cut-out such that the media can be manually grasped, pincer-like through the cut-out, and removed from the slider member over the front wall.

7. A container for flat recording media comprising:
a housing having a front opening;
a slider member cooperating with said housing for receiving the recording media and sliding in a first direction between a storage position wherein the recording media is fully within said housing to an ejected position partly outside the housing, the recording media having broader faces which lie substantially parallel to the said first direction when the media is supported on said slider member, said slider member further including a front wall for closing at least the portion of said housing front opening provided for said slider member when the slider member is pushed from the ejected position into the storage position, said front wall including a cut-out;

first spring means for biasing the slider member toward the ejected position;

stop means for limiting the travel of the slider member in said first direction and therefore defining said ejected position;

locking means for holding the slider member in the storage position against the bias of said first spring means; and removal means operatively associated with said front wall for exposing portions of the broader faces of the recording media in the vicinity of the cut-out when said slider member is in the ejected position, such that the media can be manually grasped, pincer-like through the cut-out, and removed from the slider member over the front wall; and means for closing the front wall cut-out, said means for closing being operatively associated with the locking means such that said means for closing can be moved away out of the front wall cut-out by unlocking the slider member.

8. A container according to claim 7 wherein the means for closing the front wall cut out includes an unlocking button for the slider member.

9. A container according to claim 8 wherein said locking means interacts between the means for closing the front wall and the housing, in that on the hinged limb a hook is formed which in order to lock the slider member engages in a recessed catch in the housing and can be released therefrom by lifting the other of said limbs.

10. A container for flat recording media comprising:
a housing having a front opening;
a slider member cooperating with said housing for receiving the recording media and sliding in a first direction between a storage position wherein the recording media is fully within said housing to an ejected position partly outside the housing, the recording media having broader faces which lie substantially parallel to the said first direction when the media is supported on said slider member, said slider member further including a front wall for closing at least the portion of said housing front opening provided for said slider member when the slider member is pushed from the ejected position into the storage position, said front wall including a cut-out;

first spring means for biasing the slider member toward the ejected position;

stop means for limiting the travel of the slider member in said first direction and therefore defining said ejected position;

locking means for holding the slider member in the storage position against the bias of said first spring means; and removal means operatively associated with said front wall for exposing portions of the broader faces of the recording media in the vicinity of the cut-out when said slider member is in the ejected position, such that the media can be manually grasped, pincer-like through the cut-out, and removed from the slider member over the front wall; and means for closing the front wall cut-out, wherein said means for closing is biased by second spring means into an open position that exposes the front wall cut-out.

11. A container according to claim 10 wherein said second spring means is automatically released to cause exposure of the front wall cut-out upon the release of the first spring means to bias the slider member into the ejected position.

12. A container according to claim 11, further including means for returning the means for closing the front wall cut-out to a closed position from said open position when the slider member is pushed into the housing against the bias of the second spring means.

13. A container for flat recording media comprising:
a housing having a front opening;
a slider member cooperating with said housing for receiving the recording media and sliding in a first direction between a storage position wherein the recording media is fully within said housing to an ejected position partly outside the housing, the recording media having broader faces which lie substantially parallel to the said first direction when the media is supported on said slider member, said slider member further including a floor having a cut-out, the floor cut-out having one end facing towards the housing, and a front wall for closing at least the portion of said housing front opening provided for said slider member when the slider member is pushed from the ejected position into the storage position, said front wall including a cut-out;

first spring means for biasing the slider member toward the ejected position;

stop means for limiting the travel of the slider member in said first direction and therefore defining said ejected position;

locking means for holding the slider member in the storage position against the bias of said first spring means; and removal means operatively associated with said front wall for exposing portions of the broader faces of the recording media in the vicinity of the cut-out when said slider member is in the ejected position, such that the media can be manually grasped, pincer-like through the cut-out, and removed from the slider member over the front wall; and means for closing the front wall cut-out and the cut-out in the floor of the slider member, said means for closing being L-shaped in profile so as to include two limbs, and one of said limbs is joined by hinge means to said one end of the cut-out in the floor.

14. A container according to claim 13 wherein said locking means interacts between the means for closing the front wall and the housing, in that on the hinged limb a hook is formed which in order to lock the slider member engages in a recessed catch in the housing and can be released therefrom by lifting the other of said limbs.

15. A container for flat recording media comprising:
a housing having a front opening;
a slider member cooperating with said housing for receiving the recording media and sliding in a first direction between a storage position wherein the recording media is fully within said housing to an ejected position partly outside the housing, the recording media having broader faces which lie substantially parallel to the said first direction when the media is supported on said slider member, said media received on the slider member in the storage position defining a removal plane, said slider member further including a front wall for closing at least the portion of said housing front opening provided for said slider member when the slider member is pushed from the ejected position into the storage position, said front wall including a cut-out;

first spring means for biasing the slider member toward the ejected position;

stop means for limiting the travel of the slider member in said first direction and therefore defining said ejected position;

locking means for holding the slider member in the storage position against the bias of the first spring means; and removal means operatively associated with said front wall for exposing portions of the broader faces of the recording media in the vicinity of the cut-out when said slider member is in the ejected position said removal means including means for pivoting the front wall, such that the media can be manually grasped, pincer-like through the cut-out, and removed from the slider member over the front wall along the removal plane.

16. A container according to claim 15 wherein the means for pivoting the front wall includes a pivotable front wall assembly connected to the slider member by hinge means.

17. A container according to claim 16 wherein the hinge means comprises a film link.

18. A container according to claim 16 wherein the front wall is spring-biased by second spring means toward the pivoted position.

19. A container according to claim 18 wherein the second spring means is a leaf spring arranged in the region of the hinge means.

20. A container according to claim 18 wherein said second spring means is a leaf spring arranged in the region of the hinge means.

21. A container according to claim 15 wherein the means for pivoting the front wall includes means for propelling the slider member in a pivoting movement about an axis which is substantially perpendicular to its direction of sliding movement.

22. A container according to claim 21 wherein the slider member has a floor and parts of the front wall on either side of the cut-out are connected by way of a section of the slider member floor which is substantially perpendicular to the front wall.

23. A container according to claim 21 wherein the slider member is spring-biased into its pivoted position about said axis.

24. A container according to claim 15 wherein the slider member includes a floor plate, provided with a dish-like depression, to receive a disc shaped record media.

25. A container according to claim 24 wherein the floor plate has a dish-like depression on both sides.

26. A container for flat recording media comprising:
a housing having a front opening;
a plurality of slider members arranged one above the other and cooperating with said housing for receiving the recording media and sliding in a first direction between a storage position wherein the recording media is fully within said housing to an ejected position partly outside the housing, the recording media having broader faces which lie substantially parallel to the said first direction when the media is supported on said slider member, said slider member further including a front wall for closing at least the portion of said housing front opening provided for said slider member when the slider member is pushed from the ejected position into the storage position, said front wall including a cut-out;
first spring means for biasing the slider member toward the ejected position;
stop means for limiting the travel of the slider member in said first direction and therefore defining said ejected position;
locking means for holding the slider member in the storage position against the bias of said first spring means; and
removal means operatively associated with said front wall for exposing portions of the broader faces of the recording media in the vicinity of the cut-out when said slider member is in the ejected position, such that the media can be manually grasped, pincer-like through the cut-out, and removed from the slider member over the front wall;
buttons for releasing the locking means, the release button of adjacent slider members being arranged in the region of the front wall so that the buttons are staggered in relation to one another.

* * * * *

UNITED STATES PATENT AND TRADEMARK OFFICE
CERTIFICATE OF CORRECTION

PATENT NO. : 4,807,749

DATED : February 28, 1989

INVENTOR(S) : Peter Ackeret

It is certified that error appears in the above-identified patent and that said Letters Patent is hereby corrected as shown below:

In column 6, line 44, for "side" read --said--.

Signed and Sealed this

Twentieth Day of March, 1990

Attest:

JEFFREY M. SAMUELS

Attesting Officer

Acting Commissioner of Patents and Trademarks